UNITED STATES PATENT OFFICE.

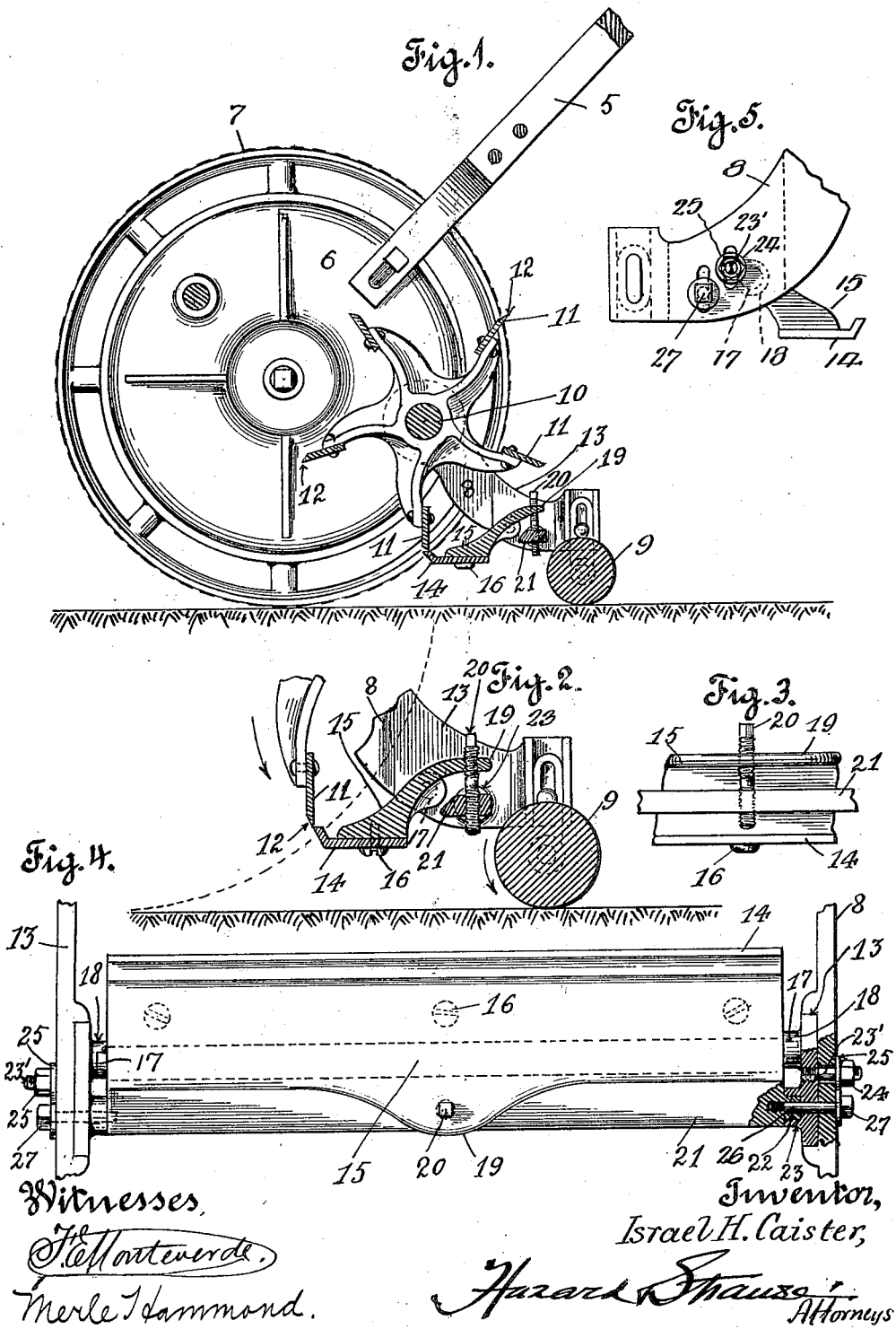

ISRAEL H. CAISTER, OF BURBANK, CALIFORNIA, ASSIGNOR OF ONE-HALF TO CALEB C. CAISTER, OF LOS ANGELES, CALIFORNIA.

LAWN-MOWER.

1,144,690. Specification of Letters Patent. Patented June 29, 1915.

Application filed August 6, 1913. Serial No. 783,327.

*To all whom it may concern:*

Be it known that I, ISRAEL H. CAISTER, a citizen of the United States, residing at Burbank, in the county of Los Angeles and State of California, have invented new and useful Improvements in Lawn-Mowers.

This invention relates to lawn mowers, and more particularly to the cutter bars attached to a lawn mower, and the principal object of this invention is to provide means for adjusting a cutter bar from one to another position on the mower.

It is a further object to provide an additional cross bar from which the cutter bar is adjusted by means of a swivel connection.

In the drawings accompanying this specification and forming therewith the application for Letters Patent: Figure 1 is a sectional view showing one end of the cutter in elevation. Fig. 2 is a large detail section through the center thereof similar to section shown in Fig. 1. Fig. 3 is a rear view of the swiveled cross bar and the screw forming the adjustment. Fig. 4 is a plan view of the cutter bar, the side bars being shown in section. Fig. 5 is a side elevation in detail of the end of the frame showing the fastening means for the adjustable journals.

Heretofore in the operation of lawn mowers provided with a revolving cutting blade adjustment of the cutter bar in relation to the revolving blades has been awkward, particularly where it is adjusted at the two ends of the bar, an operation which is difficult to perform accurately and readily. This invention overcomes the above difficulties in providing a single adjusting means midway between the two ends.

More specifically in the drawings, 5 designates a portion of the yoke of the lawn mower secured to the side frame 6 which is provided with the usual driving wheel 7, the frame 6 being provided with a rearwardly projecting arm 8 having a slotted groove for the adjustable journal support 13 and a slotted channel within which is adjustably mounted the bearings of the roller 9. Mounted on a suitable shaft 10 are the rotating blades 11 on the reel which in their path of rotation are closely approximated at their outer edges 12 with the edge of the bed knife 14 which is shown secured to the under side of the bed knife bar 15 by means of the fastening 16 shown as machine screws. This bed bar is of the general elongated form commonly used in this type of device, provided with trunnions 17 which are pivotally mounted within journals 18 formed in the journal support 13. The central portion of the bed bar 15 is preferably extended rearwardly and upwardly to form the extension 19 in which is formed a threaded bore adapted to receive the screw bolt 20, the head of the bolt preferably projecting above the extension so as to be within easy reach of the operator desiring to adjust the bed knife.

To form a fulcrum or base to provide for the adjustment and support of the screw bolt 20 a brace bar 21 is provided having trunnions 22 pivoted in bearings 23 formed in the journal support 13, which bearings are preferably located below the pivotal means of the bed knife bar and in rear thereof. The central portion of the brace bar 21 is provided with a threaded bore in which the lower end of the screw 20 engages. This pivotal bar provides the swiveling movement required by the screw 20, this latter being reversely threaded in the different bores so a rapid adjustment is possible.

To secure the adjustable journal support 13 in relation to the arm 8 a plurality of slots are formed therein vertically disposed, one of which is adapted to accommodate the stud 23′ which is threaded into the block and secured by any suitable means therein, the outwardly disposed end being also threaded to receive and permit the application thereto of a tightening nut 24, a washer 25 being preferably interposed between the nut and the side of the frame. This stud is duplicated on each side of the machine and in order to support and hold the said frame in more rigid relation the trunnions 22 formed on the brace bar 21 are concentrically bored to receive the bolt 26 which is provided with a head 27 which extends outside the vertically disposed slot within which it is inserted in the frame 8, and by setting up on these bolts, one disposed on either end, the side frames are held in rigid relation to the brace bar; the bolts 26 having threaded engagement with the brace bar 21.

In assembling the machine the reel with its cutting blades is placed in position and the cutting bar mounted in its trunnions, together with the brace bar 21 and any irregularities in the castings forming the side frames 8 may be taken up by shifting the two sliding blocks 13 up or down so that the edge of the knife blade 14 is in parallel relation to the knife edges 12. After this it will readily be seen that owing to wear, or other causes, the bed knife may be accurately adjusted in relation to the revolving blades by turning screw 20 in the required direction and preserving the blade in this rigid relation to the frame by means of a single adjusting screw, the screw 20 being formed with right and left threads at its ends where it engages the bed knife bar and the brace bar facilitates the adjustment of the bed knife bar in that a slight turn of the screw will cause it to advance or retract in relation to the brace bar 21 and at the same time cause the extended portion 19 of the bed knife bar to advance in a corresponding direction on the screw.

What I claim is:

1. In a lawn mower, the combination with a revolubly mounted reel and a frame on which said reel is supported, a pivotally mounted bed knife bar supported on said frame, a cross bar adjustably mounted in said frame adjacent the bed knife bar and extending parallel therewith, and a screw formed with right and left hand threads arranged with one threaded end extending through and engaging the cross bar and the other threaded end extending through and engaging the knife bar, whereby rotation of the screw will effect an adjustment of the bed knife bar.

2. In a lawn mower in combination with a rearwardly projecting frame, a revolving reel carrying knife blades mounted in said frame, a pivoted knife bed bar carrying a bed knife, of an extension formed on said bed knife bar extending rearwardly and upwardly from the pivotal axis of said bar, said extension having a threaded aperture therein, a cross bar pivotally mounted intermediate of said rear frame having a reversely threaded aperture therein midway of said frame and adapted to register with the aperture in the extension, and a screw having right and left threads engaged within said threaded apertures whereby adjustment is effected of the bed knife bar.

3. In a lawn mower in combination with a rearwardly projecting frame having a plurality of slots therein, a revolving wheel carrying knife blades mounted in said frame, a pivoted knife bed carrying a bed knife, bed blocks slidably adjustable in relation to said frame having journals to support said knife blade bar, a cross bar pivotally mounted in the journals on said adjustable blocks, means to secure said blocks in relation to certain of said slots in said frame, and a threaded screw to adjust and connect said bed knife bar and said cross bar intermediate of their journal supports, said screw having right hand threads engaging one bar and left hand threads engaging the other bar whereby on rotation of the screw adjustment is effected of the bed knife bar for wear and irregularity in the castings forming said side bars.

4. In a lawn mower, a pair of rearwardly projecting arms, two sets of journals on said arms mounted for vertical adjustment, a bed knife bar pivotally carried by one set of said journals, a cross bar carried by the other set of said journals extending parallel with the bed knife bar, a projection on the bed knife bar extending over the cross bar, and a screw having right and left hand threads on the opposite ends thereof arranged intermediate the ends of the cross bar with one threaded end extending through and engaging the cross bar and the other threaded end extending through and engaging the projection on the bed knife bar, said screw adapted to be rotated to effect a rocking movement of the bed knife bar on its pivotal mounting.

In witness that I claim the foregoing I have hereunto subscribed my name this 24th day of July, 1913.

ISRAEL H. CAISTER.

Witnesses:
MERLE HAMMOND,
MARIE BATTEY.

Copies of this patent may be obtained for five cents each, by addressing the "Commissioner of Patents, Washington, D. C."